US008813076B2

(12) United States Patent
Anderson et al.

(10) Patent No.: US 8,813,076 B2
(45) Date of Patent: Aug. 19, 2014

(54) VIRTUAL MACHINE UPDATES

(75) Inventors: Ray W. Anderson, Liberty Hill, TX (US); James A. Pafumi, Leander, TX (US); Jacob J. Rosales, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 13/298,848

(22) Filed: Nov. 17, 2011

(65) Prior Publication Data

US 2013/0132945 A1    May 23, 2013

(51) Int. Cl.
*G06F 9/455* (2006.01)
*G06F 21/00* (2013.01)
*G06F 9/26* (2006.01)

(52) U.S. Cl.
USPC ................................ 718/1; 711/6; 711/203

(58) Field of Classification Search
None
See application file for complete search history.

(56) References Cited

U.S. PATENT DOCUMENTS

| 7,356,679 | B1 | 4/2008 | Le et al. |
| 7,962,620 | B2 | 6/2011 | Safari et al. |
| 2004/0230794 | A1* | 11/2004 | England et al. ............... 713/164 |
| 2007/0300220 | A1* | 12/2007 | Seliger et al. ..................... 718/1 |
| 2008/0104588 | A1 | 5/2008 | Barber et al. |
| 2008/0271017 | A1* | 10/2008 | Herington ......................... 718/1 |
| 2009/0089780 | A1* | 4/2009 | Johnson et al. .................... 718/1 |
| 2009/0222806 | A1 | 9/2009 | Faus et al. |
| 2010/0058106 | A1 | 3/2010 | Srinivasan et al. |
| 2010/0088699 | A1* | 4/2010 | Sasaki ............................... 718/1 |
| 2010/0115512 | A1 | 5/2010 | Sakai |
| 2010/0162047 | A1 | 6/2010 | Haley et al. |
| 2010/0250908 | A1 | 9/2010 | Amann et al. |
| 2010/0257331 | A1* | 10/2010 | Frank ............................. 711/166 |
| 2011/0072254 | A1* | 3/2011 | Kuang et al. ....................... 713/2 |
| 2011/0078681 | A1 | 3/2011 | Li et al. |
| 2011/0107007 | A1* | 5/2011 | van Riel et al. .................... 711/6 |
| 2011/0145496 | A1* | 6/2011 | Whaley et al. ................ 711/112 |
| 2011/0265076 | A1* | 10/2011 | Thorat et al. .................. 717/172 |
| 2012/0005676 | A1* | 1/2012 | Nakajima ......................... 718/1 |
| 2012/0005677 | A1* | 1/2012 | Fujiwara .......................... 718/1 |
| 2012/0167080 | A1* | 6/2012 | Vilayannur et al. .............. 718/1 |
| 2012/0254864 | A1* | 10/2012 | Bork et al. ........................ 718/1 |

FOREIGN PATENT DOCUMENTS

JP         2007323354 A      12/2007

OTHER PUBLICATIONS

Zalewski, Andrzej, "Dynamic Software Management on VMware View Linked Clones" (online), Mar. 2011, CA Technologies (11 pages).
Nicolae, Bogdan, et al., "Going Back and Forth: Efficient Multideployment and Multisnapshotting on Clouds," The 20th International ACM Symposium on High-Performance Parallel and Distributed Computing, Jun. 2011, San Jose, CA (12 pages).

* cited by examiner

*Primary Examiner* — Adam Lee
(74) *Attorney, Agent, or Firm* — James L. Baudino

(57) ABSTRACT

Various systems, processes, and products may be used to update virtual machines. In particular implementations, a system, process, and product for updating virtual machines may include the ability to determine whether a change to a portion of an operating system for a virtual machine is available and identify a virtual machine using the operating system. The system, process, and product may also include the ability to determine when the virtual machine is modifiable and update the portion of the operating system for the virtual machine when it is modifiable.

16 Claims, 6 Drawing Sheets

VIRTUAL MACHINE UPDATES

BACKGROUND

The present invention relates to computer systems, and more particular to virtual machines.

Cloud computing often requires the ability to quickly scale computing resources as demands change. Virtual machines techniques, which are available from a number of companies, including International Business Machines of Armonk, N.Y. and VMWare Inc. of Palo Alto, Calif., allow a portion of a relatively large computer system to be formed into a smaller computer system for a specific purpose as needed. For instance, a portion of a server system may be formed into a Web server. Moreover, the smaller computer system may be replicated as needed to provide more computing resources. For instance, a large number of Web servers could be quickly formed from a first Web server. Thus, virtual machines may be implemented quickly and are quite useful in cloud computing environments.

BRIEF SUMMARY

In one implementation, a process for virtual machine updates may include determining whether a change to a portion of an operating system for a virtual machine is available and identifying a virtual machine using the operating system. The process may also include determining when the virtual machine is modifiable and updating the portion of the operating system for the virtual machine when it is modifiable. The process may, for example, be performed by a server system or computer program product.

The details and features of various implementations will be conveyed by the following description, along with the drawings.

DETAILED DESCRIPTION

Virtual machines may updated by various techniques. In particular implementations, the operating system for a number virtual machines may be automatically updated without interrupting normal operations. Thus, the performance of the virtual machines may be enhanced without causing disruptions.

Figure 1:
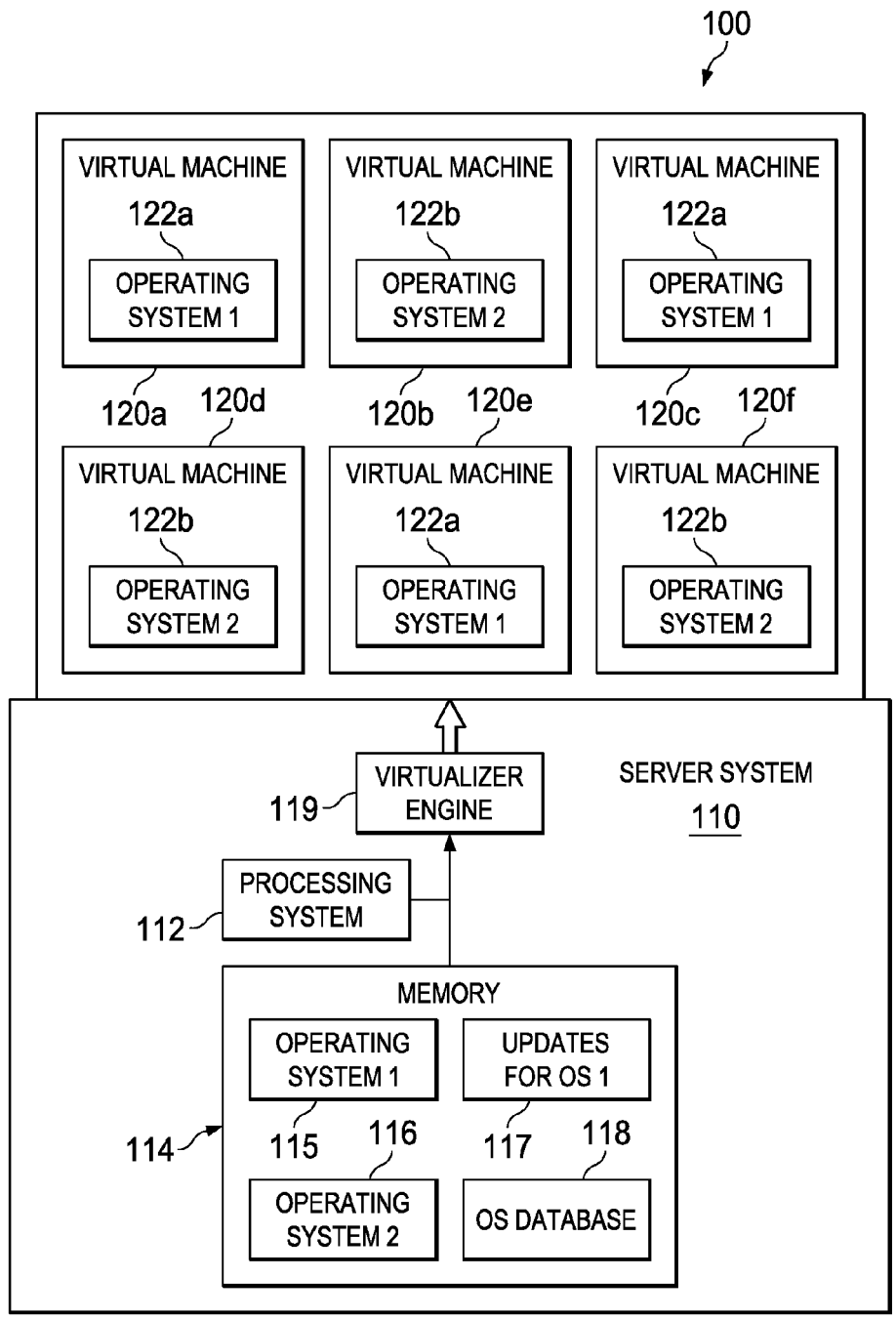
FIG. 1 is a block diagram illustrating an example system for virtual machine updates.

FIG. 1 illustrates a system 100 for updating virtual machines. System 100 includes a server system 110 on which a number of virtual machines 120 are operating. Server system 110 includes a processing system 112, memory 114, and a virtualizer engine 119. Server system 110 may be composed of various hardware and software components, such as, for example, servers, processors, databases, and storage areas. Server system 100 may, for instance, be a data center. Server system 110 may appear as a single server to applications using and accessing it. Server system may, for instance, use virtualization to appear as an integrated server system.

In particular implementations, server system 110 may be a virtual input-output server (VIOS) from International Business Machines of Armonk, N.Y. A VIOS may provide an operating environment for virtual I/O administration. A VIOS may also facilitate the sharing of physical I/O resources between the virtual machines supported by server system 110, such as virtual machines 120, by creating virtual devices. For example, a VIOS may provide virtual small computer system interface (SCSI) target and shared Ethernet adapter capability to client virtual machines within the data processing system, enabling the client virtual machines to share SCSI devices and Ethernet adapters.

Memory 114 includes, among other things, operating systems 115 for virtual machines 120. Memory 114 also includes updates 116 for operating system 115a and a database 118, which will be discussed in more detail below.

Virtualizer engine 119 is responsible for providing an interface between virtual machines 120 and server system 110, which is responsible for actually executing the operations of the virtual machines 120 and transferring data to and from memory 114. Virtualizer engine 119 may export various virtualized hardware components such as virtual CPU(s), virtual memory, virtual disks, and virtual devices as constructs or emulations to the virtual machines. Thus, virtualizer engine 119 may make the resources of server system 110 appear as a single server when it is in fact a number of server systems. In particular implementations, virtualizer engine 119 may be a thin piece of software that runs on a host (e.g., along with the host operating system) or through an intervening kernel, which performs the functions of the host operating system.

In some implementations, virtualizer engine 119 may include a VIOS, a hypervisor, and a hardware management console. A hypervisor, also known as a virtual machine manager, is a program that enables multiple operating systems, such as, but not limited, to operating systems 115, to share a single hardware host. Each operating system may appear to have the host's processor, memory, and other system resources all to itself. However, the hypervisor may actually control the host processor and the system resources, allocating the necessary resources to each operating system. The virtualizer engine, for example, may be built on Advanced Interactive eXecutive (AIX) from International Business Machines.

Each virtual machine 120 is a segmentation of server system 110, virtualized as a separate computer system. In a VIOS environment, for example, each virtual machine 120 is a logical partition of server system 110. Virtual machines 120 can be quickly deployed by allowing the image of the executable code that composes the solution for which the virtual machine partition is created to be shared amongst all similar virtual machines. Each virtual machine 120 may, however, behave as an independent computer system. Virtual machines 120 may, for example, be servers (e.g., Web, application, or database) or other appropriate types of computer systems.

Each of virtual machines 120 includes an operating system 122, which is an image of one of operating systems 115. Operating systems 122 may actually be different operating systems (e.g., Linux, Unix, and AIX) or different versions of the same operating system (e.g., 1.2, 1.4, and 2.1). Virtual machines 120 may run the same operating system (e.g., Linux), or, as illustrated, they may run different operating systems. The applications for each virtual machine 120 may also be different.

In certain modes of operation, when a virtual machine 120 is generating, its operating system 122 may be cloned from one or operating systems 115. For instance, in a VIOS environment, a distributed file system can represent can represent a file as a Small Computer System Interface (SCSI) storage device (e.g., a disk). The file system may allow a file to be cloned, which creates a new file that uses the data in the original file. In particular implementations, the file may be sparse.

Additionally, the blocks that compose the operating system in the master image may be identified when it is created. In the IBM AIX operating system, these are known as filesets. This may, for example, be accomplished with tools that associate logical maintenance components of the operating system with logical disk blocks.

For instance, there are a variety of tools that various development organizations use to package code into deliverables. The tools are invoked as part of what is known as a packaging build. In the AIX environment, for example, these are known as build tools. These tools may be used to build an operating system image from logical pieces of the operating system that themselves are packaged into sets of code files. Similar tools exist for Linux.

The build tools could be enhanced to keep logical operating system pieces (e.g., file sets) on a logical block boundary. Examples of logical operating system pieces include drivers, the file system, and sockets. In implementation, the default size of the file system logical block could be used (e.g., with a minimum of 512 bytes). The logical block boundary may then be reported to virtualizer engine 119, and the OS image file set may be written by file set while ensuring that writes for one file set are complete before starting to write the next file set. The file set tag may then be reported to the virtualizer engine before starting to write the next file set.

The virtualizer engine may build a table using the logical block boundary information as writes arrive for that device and store them as meta data for that operating system image. The table may include tag information passed by the tool.

The blocks of which an operating system is composed may be mapped to logical disk blocks via the virtualizer engine. Moreover, places in which only a part of a logical disk block is filled may be padded to isolate partial file blocks from the rest of operating system. The relationship between file blocks and the logical disk blocks may be stored in database 116, which may, for example, be a relational database (e.g., Structured Query Language (SQL)). Database 116 may not be visible to clients of virtual server system 110.

Figure 2:
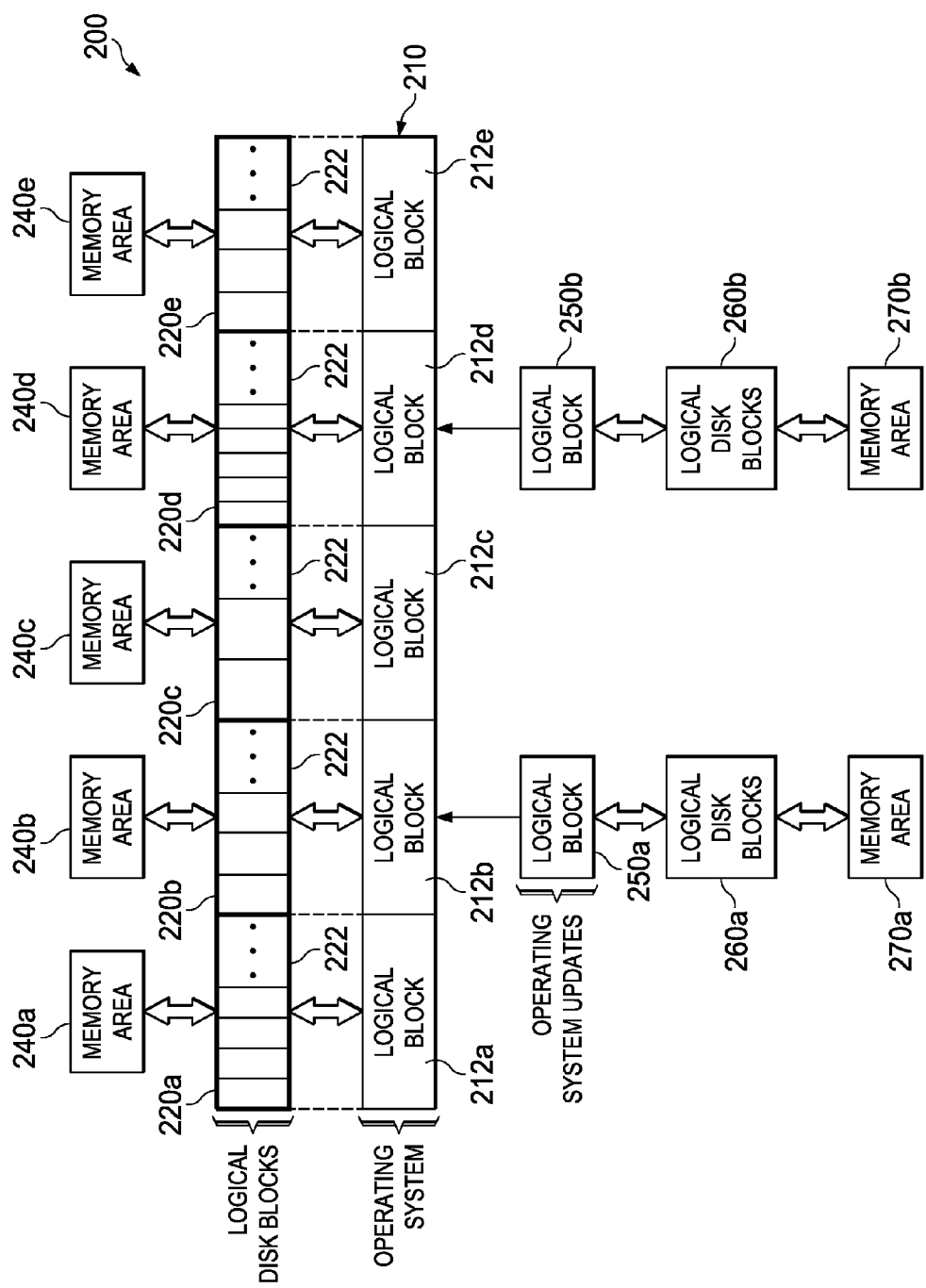
FIG. 2 is a block diagram illustrating an example relationship between an operating system and its storage for a system for virtual machine updates.

FIG. 2 illustrates an example relationship 200 between file blocks and disc blocks for an operating system 210. As illustrated, operating system 210 has been portioned into a number of logical file blocks 212. Each logical file block 212 may, for example, relate to a different operational feature of operating system 210. The logical file blocks may be different sizes according to the amount of associated code.

Each logical block 212 is associated with one or more logical disk blocks 220, the number of logical disks 220 associated with each logical block varying depending on the size of logical block 212. The last logical block 220 associated with each logical block 212 includes a padded portion 222. Padded portion 222 is added to each logical block 220, if necessary, to ensure that it maps to a whole number of logical disk blocks 220.

Logical disk blocks 220 are stored in memory areas 230. Memory area 230 may, for example, be one or more actual disk blocks that store logical disk blocks 220. Logical disk blocks 220 may be stored together on a single disk, at scattered areas on a single disk, or on different disks. A number of disks may appear as a single disk to virtual machines 120.

Returning to FIG. 1, if a portion of an operating system 122 needs to be replaced (e.g., for maintenance), virtualizer engine 119 is instructed to replace the file system block with the new code image. Maintenance may, for example, need to be performed to fix bugs and security issues. The virtualizer engine uses database 116 to write the new data on file system block boundaries. The new blocks are not accessible to a cloned file until that clone is safe for update.

To perform maintenance, for example, a programmer may make changes to an operating system 120 in a conventional manner. The changes are associated with a logical block 212 (e.g., a file set). The system determines an identifier (e.g., a tag value) for the logical block, and the virtualizer engine maps the new logical blocks to the old ones.

FIG. 2 illustrates this technique for one implementation. As illustrated, operating system 210 has updates 250, which are respectively associated with specific logical blocks 220 of operating system 210. Logical blocks 252 are replacements for logical blocks 220.

Like logical blocks 220, logical blocks 252 are mapped to logical disk blocks, denoted 260. Logical disk blocks 260 may be composed of a number of disk blocks and padded as needed to make logical blocks 252 map to a whole number of logical disk blocks 260.

Logical disk blocks 260 are stored in memory areas 270. Memory areas 270 may, for example, be disk blocks that correspond to logical disk blocks 260, although not necessarily in a one-to-one fashion. Logical disk blocks 260 may be stored together on a single disk, at scattered areas on a single disk, or on different disks.

When one of logical blocks 212 needs to be replaced (i.e., to update the associated operating system), database 116 may note that a replacement for the block exists. Furthermore, virtualizer engine 119 may map the logical block to memory areas 270. Thus, in the illustrated implementation, when a virtual machine is available to be updated (e.g., during a scheduled reboot or after a system crash), the virtualizer engine may swap out logical block 212*b* for logical block 262*a* and logical block 212*d* for logical block 262*b*.

The operating system of a virtual machine 120 may, for example, be safe to update when the virtual machine is undergoing a reboot (whether scheduled or not). A reboot may, for example, be scheduled based on requirements of a client's customer. Virtualizer engine 119 may, for example, detect when a virtual machine is undergoing a reboot (e.g., when it is trying to load firmware) and cause a switch in the operating system code before a read begins. When this occurs, the virtual machine may read the blocks as directed by database 116. In doing so, it may perform a read of the entire block into a new block unique to that file and apply the write, which is known as a read on write.

In particular implementations, for instance, a firmware driver may attempt to load a boot image into memory, and when the driver does so, it reads that boot image from storage through the virtual engine. The log on request, which may be required by standards, may include identifying information stating it is firmware. The virtual engine can then safely redirect that client's I/O to the updated operating system image at the time of that log in. This would be an extension to a read on write solution.

The updates to the affected virtual machines 120 may proceed as they become modifiable. For instance, in FIG. 1, operating system 122*a* has updates 116 waiting to be applied.

Since virtual machines 120*a*, 120*c*, and 120*e* have the same operating system 122*a*, they may all need to be updated.

Database 116 may keep track of which machines have been updated and which have not. Once all of the associated virtual machines have read the new code, the memory containing the old blocks may be reclaimed (e.g., released) in the memory of server system 110.

System 100 has a variety of features. For example, by making updates to one image of an operating system, updates may be automatically propagated to the virtual machines that are using the operating system. As large virtual server systems may support hundreds of virtual machines that are all running the same operating system, this may avoid having to manually stop each virtual machine, make the desired updates, and reboot the machine, reducing time and effort and avoiding errors. Additionally, the updates may be made during scheduled reboot sequences. Thus, the normal operations of the virtual machines do not have to be interrupted to perform the updates.

System 100 could also be used for hot patching. For example, once a hot patch is successfully in place, the patch may be written to disk using a tool, such as, for example, emgr in AIX. This tool also deals in filesets and could be updated to use the tags discussed in previous sections to replace the file set. Thus, the same patch could be applied to all VMs on their next boot.

Although FIG. 1 illustrates one system for performing virtual machine updates, other systems may include fewer, additional, and/or a different configuration of components. For example, some systems may include segmentations of segmentations (e.g., workload partitions). As another example, management tools can show relationships between master images and dependent logical partitions to alleviate the system administrator from having to track these dependencies. For instance, as part a result of a query, the VIOS may produce a data stream that describes the relationship in regards to sharing sparse files. Other management tools that have logic to consume a well-formed data stream may be used.

As an additional example, a server system may have its own operating system, which may be different from operating system for virtual machines. As a further example, a server system may have a network interface card.

System 100 may be useful in cloud computing environments, which can require large scaling capabilities and therefore end up with a large number of virtual machines. System 100 may also be capable of being implemented in conjunction with other types of computing environments.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

The cloud model may include various characteristics. For example, the cloud model may include on-demand self-service, in which a cloud consumer can unilaterally provision computing capabilities (e.g., server time and network storage) as needed, broad network access, in which capabilities are available over a network and accessed through standard mechanisms, and resource pooling, in which the provider's computing resources are pooled to serve multiple consumers using a multi-tenant model, with different physical and virtual resources dynamically assigned and reassigned according to demand. The cloud model may also include rapid elasticity, in which, capabilities can be rapidly and elastically provisioned to quickly scale out and rapidly released to quickly scale in, and measured service, in which cloud systems automatically control and optimize resource use by leveraging a metering capability at some level of abstraction appropriate to the type of service (e.g., storage, processing, bandwidth, and active user accounts). Resource usage can be monitored, controlled, and reported to provide transparency for both the provider and consumer of the utilized service.

The cloud model may also include various models. For example, the cloud model may include Software as a Service (SaaS), in which the consumer has the ability to access the provider's applications running on a cloud infrastructure though a client interface (e.g., a web browser), or Platform as a Service (PaaS), in which the consumer has the ability to deploy onto the cloud infrastructure consumer-created or acquired applications created using programming languages and tools supported by the provider. Additionally, the cloud model could include Infrastructure as a Service (IaaS), in which the consumer has the ability to provision processing, storage, networks, and other fundamental computing resources where the consumer is able to deploy and run arbitrary software, which can include operating systems and applications.

The cloud model may also include various deployment models. For example, the deployment models may include a private cloud, in which the cloud infrastructure is operated solely for an organization, or a community cloud, in which the cloud infrastructure is shared by several organizations and supports a specific community that has shared concerns (e.g., mission, security requirements, policy, and compliance considerations). Additionally, the deployment models may include a public cloud, in which the cloud infrastructure is made available to the general public or a large industry group and is owned by an organization selling cloud services, or a hybrid cloud, in which the cloud infrastructure is a composition of two or more clouds (private, community, or public) that remain unique entities but are bound together by standardized or proprietary technology that enables data and application portability. The various deployments may be managed by the responsible organizations or a third party and may exist on-premises or off-premises.

A cloud computing environment is generally service oriented with a focus on statelessness, low coupling, modularity, and semantic interoperability. The cloud computing is typically an infrastructure composed of a network of interconnected nodes.

Figure 3:
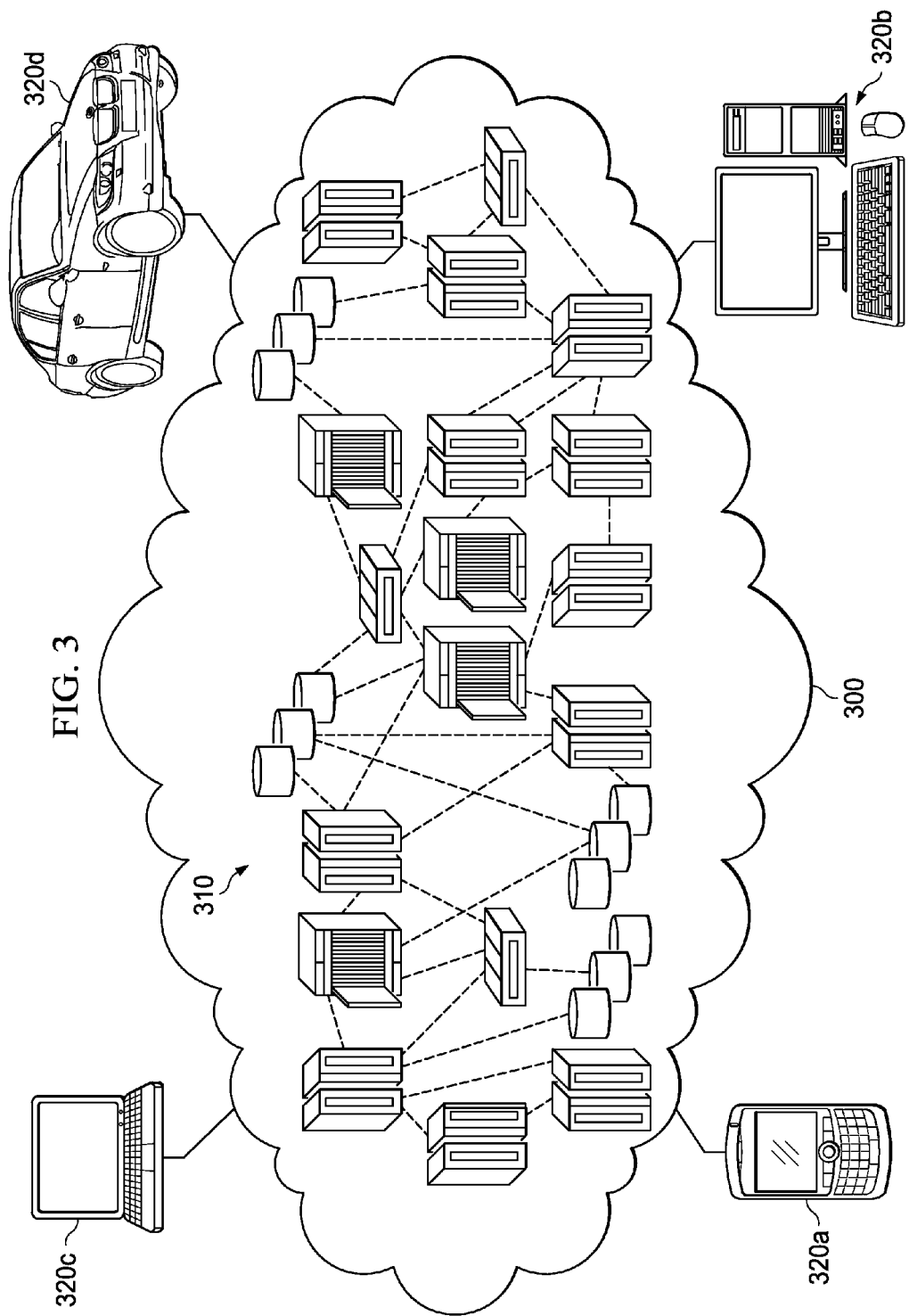
FIG. 3 is a line drawing illustrating an example cloud computing environment.

FIG. 3 illustrates an example cloud computing environment 300. As shown, cloud computing environment 300 includes one or more computer systems 310 with which computing devices 320 used by cloud consumers (e.g., smart phone 320*a*, desktop computer 320*b*, laptop computer 320*c*, and/or automobile computer system 320*d*) may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 300 to offer infrastructure, platforms and/or software as services for which a cloud consumer does not need to maintain resources on a local computing device. It is understood that the types of computing devices 320 shown in FIG. 3 are intended to be illustrative only and that computing nodes 310 and cloud computing environment 300 can communicate with any type of computerized device over any type of network and/or network addressable connection (e.g., using a web browser).

Figure 4:
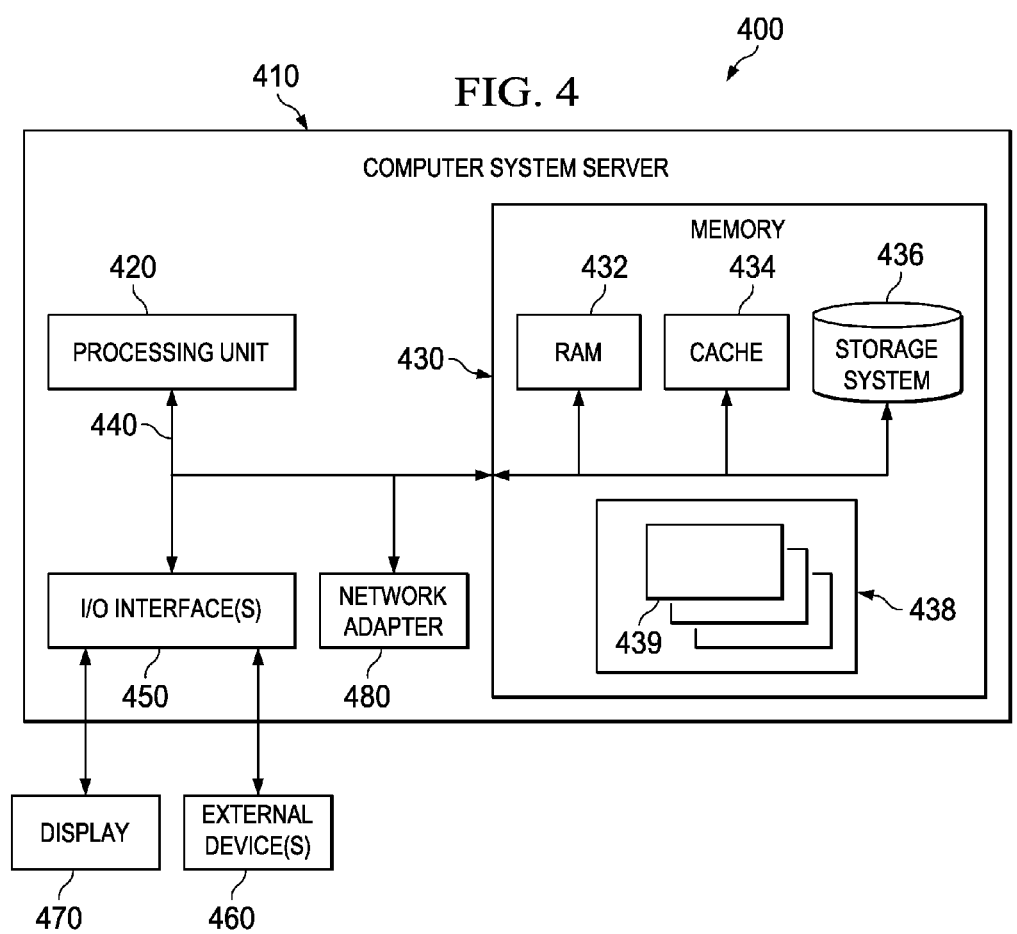
FIG. 4 is a block diagram illustrating an example computer system.

FIG. 4 illustrates an example computer system 400, which may, for example, be a node in cloud environment. Computer system 400 may, for instance, be a server system like server system 100. Computer system 400 is only one example of a suitable computer system and is not intended to suggest any limitation as to the scope of use or functionality of other implementations described herein. Regardless, computer system 400 is capable of being implemented and/or performing any of the functionality set forth hereinabove.

Computer system 400 is operational with numerous other general purpose or special purpose computing system environments or configurations. Examples of well-known computing systems, environments, and/or configurations that may be suitable for use with computer system 400 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 400 may be described in the general context of computer system executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

Computer system 400 is shown in the form of a general-purpose computing device. The components of computer system 400 may include, but are not limited to, one or more processors or processing units 420, a system memory 430, and a bus 440 that couples various system components including system memory 430 to processor 420.

Bus 440 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 400 typically includes a variety of computer system readable media. Such media may be any available media that is accessible by computer system 400, and it includes both volatile and non-volatile media, removable and non-removable media.

System memory 430 can include computer system readable media in the form of volatile memory, such as random access memory (RAM) 432 and/or cache memory 343. Computer system 400 may further include other removable/non-removable, volatile/non-volatile computer system storage media. By way of example only, a storage system 436 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 440 by one or more data media interfaces. As will be further depicted and described below, memory 430 may include at least one program product having a set (e.g., at least one) of program modules that are configured to carry out the functions of embodiments of the invention.

Program/utility 438, having a set (at least one) of program modules 439, may be stored in memory 430 by way of example, and not limitation, as well as an operating system, one or more application programs, other program modules, and program data. Each of the operating system, one or more application programs, other program modules, and program data or some combination thereof, may include an implementation of a networking environment. Program modules 439 generally carry out the functions and/or methodologies of embodiments of the invention as described herein.

Computer system 400 may also communicate with one or more external devices such as a display 460; one or more devices that enable a user to interact with computer system 400 (e.g., a keyboard or a pointing device); and/or any devices (e.g., network card, modem, etc.) that enable computer system 400 to communicate with one or more other computing devices. Such communication can occur via Input/Output (I/O) interfaces 450. Still yet, computer system 400 can communicate with one or more networks such as a local area network (LAN), a general wide area network (WAN), and/or a public network (e.g., the Internet) via network adapter 480. As depicted, network adapter 480 communicates with the other components of computer system 400 via bus 450.

It should be understood that although not shown, other hardware and/or software components could be used in conjunction with computer system 400. Examples, include, but are not limited to: microcode, device drivers, redundant processing units, external disk drive arrays, RAID systems, tape drives, and data archival storage systems, etc.

Figure 5:
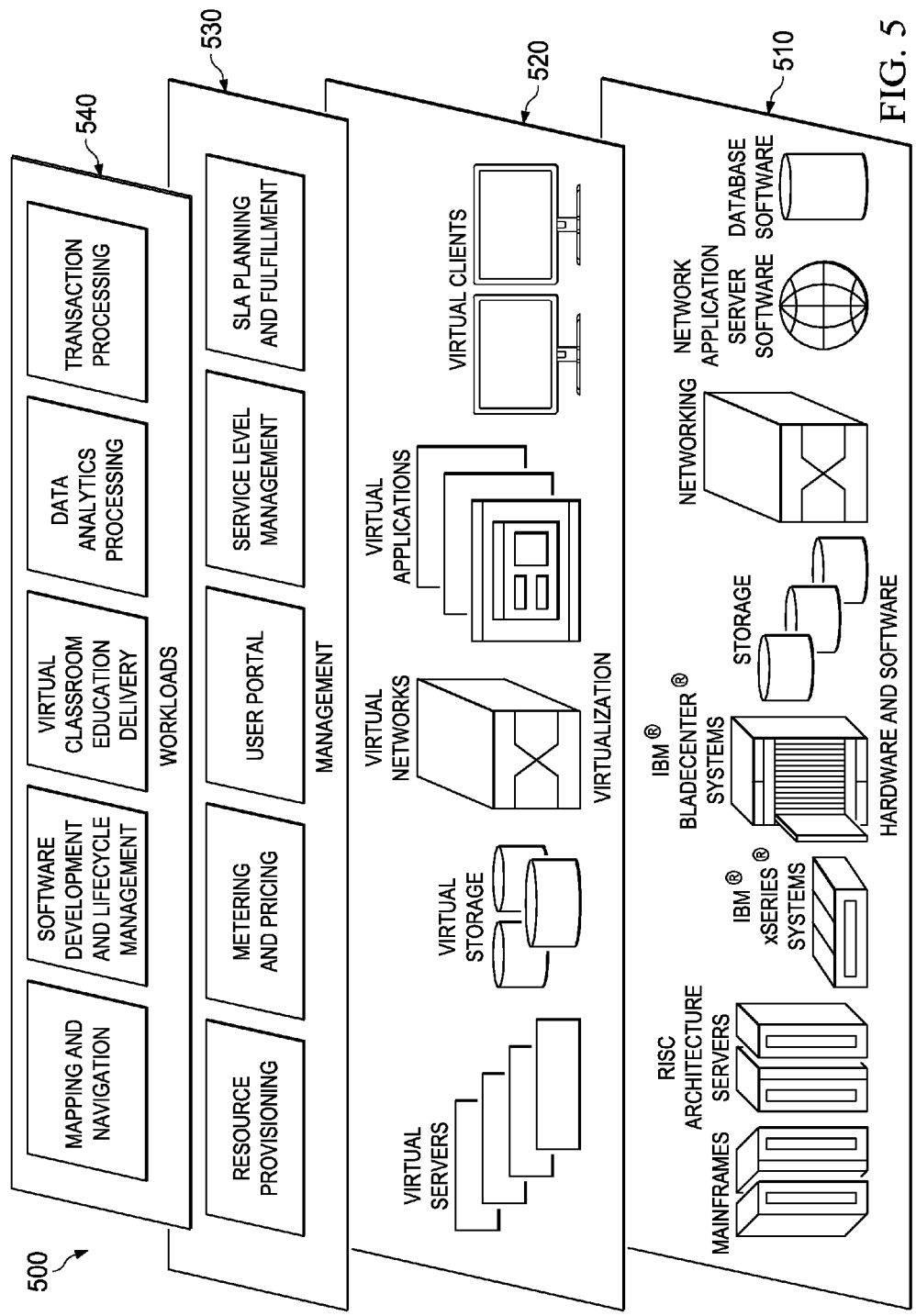
FIG. 5 is block diagram illustrating example abstraction model layers for a cloud computing environment.

FIG. 5 illustrates a set of functional abstraction layers 500 provided by cloud computing environment 300. It should be understood in advance that the components, layers, and functions shown in FIG. 5 are intended to be illustrative only and particular implementations are not limited thereto. Layers 500 include a hardware and software layer 510, a virtualization layer 520, a management layer 530, and a workload layer 540.

Hardware and software layer 510 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 520 provides an abstraction layer from which the following examples of virtual entities may be provided: virtual servers; virtual storage; virtual networks, including virtual private networks; virtual applications and operating systems; and virtual clients.

In the illustrated example, management layer 530 may provide a variety of functions, including resource provisioning, metering and pricing, user portal, service level management, and service level agreement. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 540 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 6:
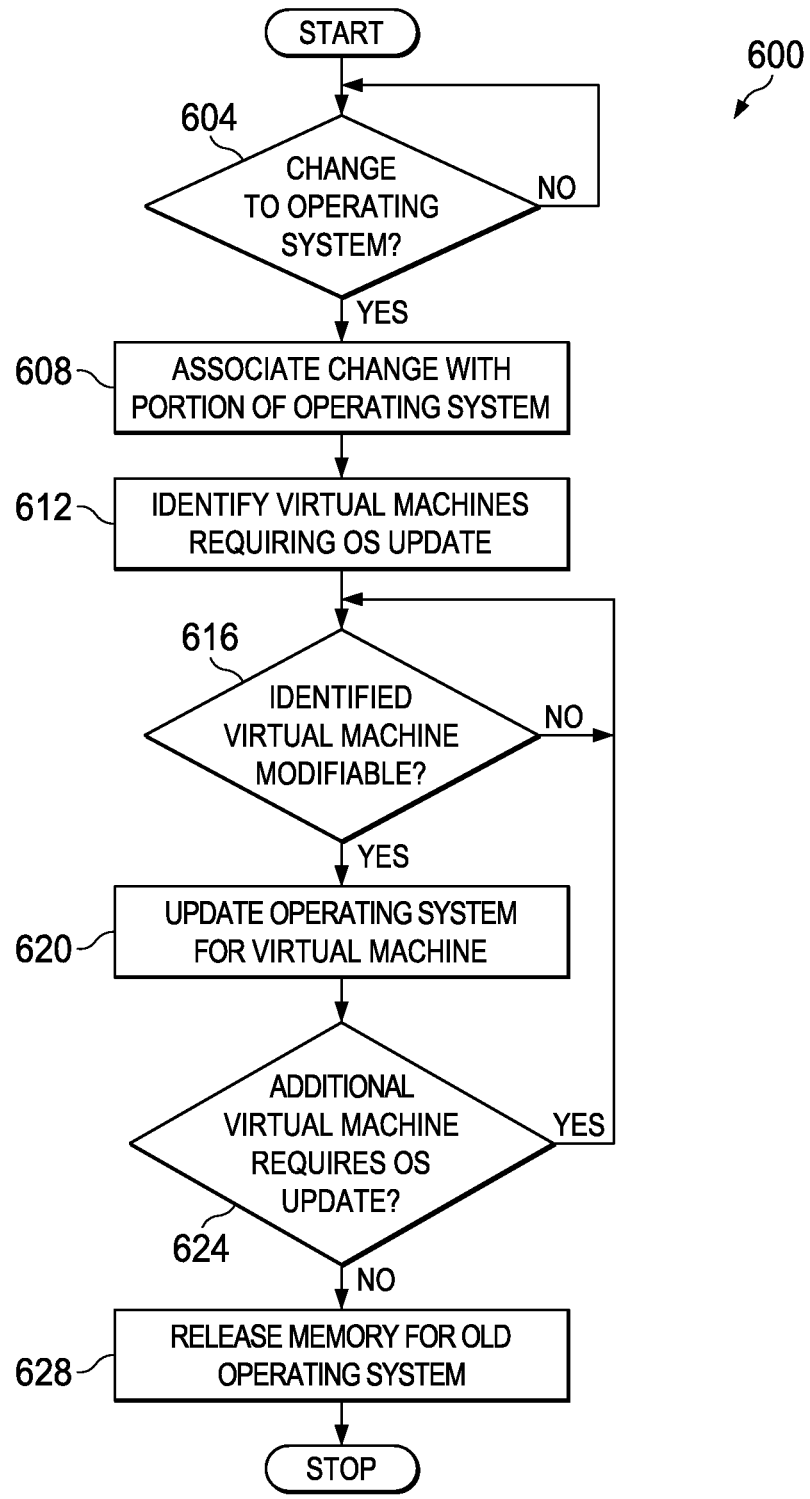
FIG. 6 is a flowchart illustrating an example process for updating virtual machines.

FIG. 6 illustrates an example process 600 for updating virtual machines. Process 600 may, for example, be implemented by a server system like server system 100.

Process 600 calls for determining whether there is a change to an operating system for a virtual machine (operation 604). A change to a virtual machine's operating system may, for example, occur when a programmer updates the operating system or a patch is downloaded.

Process 600 also calls for associating the change with a portion of the operating system (operation 608). The change may, for example, be made to a file set of an operating system.

Process 600 additionally calls for identifying virtual machines requiring an operating system update (operation 612). The virtual machines requiring an update may, for example, be identified by determining the virtual machines that are running the operating system having an update, which may, for example, be tracked in a database. In relatively large server systems, for example, there may be hundreds of virtual machines that are running the same operating system.

Process 600 further calls for determining whether an identified virtual machine is modifiable (operation 616). A virtual machine may, for example, be modifiable if it is rebooting (whether scheduled or not). If an identified virtual machine is not currently modifiable, process 600 calls for waiting for an identified virtual machine to become modifiable.

Once an identified virtual machine is modifiable, process 600 calls for updating the operating system for the virtual machine (operation 620). The operating system may, for example, be updated by substituting the changed portion(s) of the operating system with the associated portion(s). This may, for example, be accomplished before the operating system is loaded.

Process 600 also calls for determining whether additional virtual machines require an operating system update (operation 624). Determining whether additional virtual machines require an operating system update may, for example, be determined by examining a counter that was set when the virtual machines needing an operating system update was determined or examining a database regarding existing virtual machines. If additional virtual machines require an operating system update, process 600 calls for determining if an identified virtual machine is modifiable (operation 628) and waiting if one is not.

Once all of the virtual machines requiring an operating system update have been updated, process 600 calls for releasing the memory for the old portions of the operating system (operation 628). Process 600 is then at an end.

Although FIG. 6 illustrates a process for updating virtual machines, other processes for updating virtual machines may include fewer, additional, and/or a different arrangement of operations.

The flowchart and block diagrams in the figures illustrate the architecture, functionality, and operation of systems, methods, and computer program products of various implementations of the disclosure. In this regard, each block in the flowchart or block diagrams may represent a module, segment, or portion of code, which can include one or more executable instructions for implementing the specified logical function(s). It should also be noted that, in some alterative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or the flowchart illustration, and combination of blocks in the block diagrams and/or flowchart illustration, can be implemented by special purpose hardware-based systems the perform the specified function or acts, or combinations of special purpose hardware and computer instructions.

As will be appreciated by one skilled in the art, aspects of the present disclosure may be implemented as a system, method, or computer program product. Accordingly, aspects of the present disclosure may take the form of an entirely hardware environment, an entirely software embodiment (including firmware, resident software, micro-code, etc.), or an implementation combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be a tangible medium that can contain or store a program for use by or in connection with an instruction execution system, apparatus, or device.

A computer readable signal medium may include a propagated data signal with computer readable program code embodied therein, for example in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any medium, including but not limited to wireless, wireline, optical fiber cable, RF, etc. or any suitable combination of the foregoing.

Computer program code for carrying out operations for aspects of the disclosure may be written in any combination of one or more programming languages such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosure are described below with reference to flowchart illustrations and/or block diagrams of methods, apparatus (systems), and computer program products according to implementations. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other device to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions that execute on the computer or other programmable apparatus provide processes for implementing the functions/acts specified in the flowchart and/or block diagram block or blocks.

The terminology used herein is for the purpose of describing particular implementations only and is not intended to be limiting. As used herein, the singular form "a", "an", and "the" are intended to include the plural forms as well, unless the context clearly indicates otherwise. It will be further understood that the terms "comprises" and/or "comprising," when used in the this specification, specify the presence of stated features, integers, steps, operations, elements, and/or components, but do not preclude the presence or addition of one or more other features, integers, steps, operations, elements, components, and/or groups therefore.

The corresponding structure, materials, acts, and equivalents of all means or steps plus function elements in the claims below are intended to include any structure, material, or act for performing the function in combination with other claimed elements as specifically claimed. The description of the present implementations has been presented for purposes of illustration and description, but is not intended to be exhaustive or limited to the implementations in the form disclosed. Many modification and variations will be apparent to those of ordinary skill in the art without departing from the scope and spirit of the disclosure. The implementations were chosen and described in order to explain the principles of the disclosure and the practical application and to enable others or ordinary skill in the art to understand the disclosure for various implementations with various modifications as are suited to the particular use contemplated.

A number of implementations have been described for virtual machine updates, and several others have been mentioned or suggested. Moreover, those skilled in the art will readily recognize that a variety of additions, deletions, modifications, and substitutions may be made to these implementations while still achieving virtual machine updates. Thus, the scope of the protected subject matter should be judged based on the following claims, which may capture one or more concepts of one or more implementations.

The invention claimed is:

1. A system comprising:
a number of virtual machines, each virtual machine including an operating system, the operating system portioned into a plurality of logical file blocks; and
a server system comprising:
memory storing the operating system and a change to a portion of the operating system;
a virtualization engine operable to provide an interface between the virtual machines and the server system, wherein the virtualization engine maps logical disk blocks of the virtual machines to the logical file blocks, and wherein the logical disk blocks comprise a padded portion as needed to map to a whole number of respective logical file blocks; and
a processing system operable, according to the virtualization engine, to update the portion of the operating system for one of the virtual machines when the virtual machine is modifiable, wherein the portion of the operating system being updated comprises one or more new logical file blocks, and wherein updating the operating system with the new logical file block for the one virtual machine comprises replacing one or more old logical disk blocks with one or more new logical disk blocks, the new logical disk blocks comprising a padded portion to map to a whole number of the new logical file blocks.

2. The system of claim 1, wherein the processing system is further operable to:
determine whether a change to a portion of an operating system for a virtual machine is available;
identify a virtual machine using the operating system; and
determine when the virtual machine is modifiable.

3. The system of claim 2, wherein the processing system is further operable to associate the change with a portion of the operating system.

4. The system of claim 1, wherein the processing system is further operable to:
determine whether an additional virtual machine requires an update of the operating system; and
determine whether the virtual machine is modifiable.

5. The system of claim 1, wherein the processing system is further operable to release the memory for an old portion of the operating system when the virtual machines using the operating system have been updated.

6. The system of claim 5, wherein updating the portion of the operating system comprises reading from disk blocks containing the changed portion when loading the operating system.

7. A method comprising:
determining whether a change to a portion of an operating system for a virtual machine is available, the operating system portioned into a plurality of logical file blocks, and wherein logical disk blocks of the virtual machines are mapped to the logical file blocks, and wherein the logical disk blocks comprise a padded portion as needed to map to a whole number of respective logical file blocks;
identifying a virtual machine using the operating system;
determining when the virtual machine is modifiable; and
updating the portion of the operating system for the virtual machine when it is modifiable, wherein the portion of the operating system being updated comprises one or more new logical file blocks, and wherein updating the operating system with the new logical file block for the virtual machine comprises replacing one or more old logical disk blocks with one or more new logical disk blocks, the new logical disk blocks comprising a padded portion to map to a whole number of the new logical file blocks.

8. The method of claim 7, further comprising associating the change with a portion of the operating system.

9. The method of claim 7, further comprising:
determining whether an additional virtual machine requires an update of the operating system; and
determining whether the virtual machine is modifiable.

10. The method of claim 9, further comprising releasing the memory for an old portion of the operating system when the virtual machines using the operating system have been updated.

11. The method of claim 7, wherein updating the portion of the operating system comprises reading from disk blocks containing the changed portion when loading the operating system.

12. A computer program product for modifying numeric data presented on a display, the computer program product comprising:
a non-transitory computer readable medium;
first program instructions to determine whether a change to a portion of an operating system for a virtual machine is available, the operating system portioned into a plurality of logical file blocks, and wherein logical disk blocks of the virtual machine are mapped to the logical file blocks, and wherein the logical disk blocks comprise a padded portion as needed to map to a whole number of respective logical file blocks;
second program instructions to identify a virtual machine using the operating system;
third program instruction to determine when the virtual machine is modifiable; and
fourth program instructions to update the portion of the operating system for the virtual machine when it is modifiable, wherein the portion of the operating system being updated comprises one or more new logical file blocks, and wherein updating the operating system with the new logical file block for the virtual machine comprises replacing one or more old logical disk blocks with one or more new logical disk blocks, the new logical disk blocks comprising a padded portion to map to a whole number of the new logical file blocks;
wherein said program instructions are stored on said computer readable storage medium.

13. The computer program product of claim 12, further comprising fifth program instructions to associate the change with a portion of the operating system.

14. The computer program product of claim 12, further comprising sixth program instructions to:
determine whether an additional virtual machine requires an update of the operating system; and
determine whether the virtual machine is modifiable.

15. The computer program product of claim 14, further comprising seventh program instructions to release the memory for an old portion of the operating system when the virtual machines using the operating system have been updated.

16. The computer program product of claim 12, wherein updating the portion of the operating system comprises reading from disk blocks containing the changed portion when loading the operating system.

* * * * *